United States Patent
Simpson

(10) Patent No.: US 9,928,387 B2
(45) Date of Patent: Mar. 27, 2018

(54) SECURITY CASE

(71) Applicant: Charles Hallinan, Bala Cynwyd, PA (US)

(72) Inventor: Anthony T. Simpson, Lake Park, FL (US)

(73) Assignee: Charles Hallinan, Bala Cynwyd, PA (US)

( * ) Notice: Subject to any disclaimer, the term of this patent is extended or adjusted under 35 U.S.C. 154(b) by 0 days.

(21) Appl. No.: 14/214,439

(22) Filed: Mar. 14, 2014

(65) Prior Publication Data

US 2014/0298492 A1  Oct. 2, 2014

Related U.S. Application Data

(60) Provisional application No. 61/800,958, filed on Mar. 15, 2013.

(51) Int. Cl.
*G06F 21/86* (2013.01)
*G06F 21/32* (2013.01)
*G06F 21/88* (2013.01)

(52) U.S. Cl.
CPC .............. *G06F 21/86* (2013.01); *G06F 21/32* (2013.01); *G06F 21/88* (2013.01); *G06F 2221/2111* (2013.01)

(58) Field of Classification Search
CPC ....................................................... G06F 21/86
See application file for complete search history.

(56) References Cited

U.S. PATENT DOCUMENTS

| | | | | |
|---|---|---|---|---|
| 5,390,515 A * | 2/1995 | Essick | ................ | E05B 73/0023 16/425 |
| 5,977,876 A * | 11/1999 | Coleman | ................ | A45C 13/10 340/539.1 |
| 6,057,779 A * | 5/2000 | Bates | .................... | G06Q 50/28 340/10.51 |
| 6,164,442 A * | 12/2000 | Stravitz | ................... | A45C 3/02 206/233 |
| 7,482,928 B2 * | 1/2009 | Brackmann | ............... | B60P 3/03 180/290 |
| 7,961,914 B1 * | 6/2011 | Smith | .................. | A45C 13/185 340/5.52 |
| 8,742,919 B2 * | 6/2014 | Choi | .................... | G06Q 10/083 340/426.19 |
| 2002/0017978 A1 * | 2/2002 | Kanda | ................ | G07C 9/00309 340/5.61 |
| 2002/0095961 A1 * | 7/2002 | Doerr | .................... | E05B 47/063 70/278.3 |

(Continued)

*Primary Examiner* — John B King
*Assistant Examiner* — Darshan Dhruv
(74) *Attorney, Agent, or Firm* — McHale & Slavin, P.A.

(57) ABSTRACT

The present invention is a self contained, portable security case or container. The case is secure in its locked condition by locks which are preferably operated by an electronic key. The electronic key can be programmed to open the case or container dependent upon various different conditions, for example, location, time, identification of operator, etc. In addition to the electronic key, a biometric identification device can be employed. The exterior of the case or container is made from different materials which are impermeable and resistant to heat, drilling and ballistic impact. A GPS type of location device located within the case enables the case to be tracked from remote locations.

17 Claims, 16 Drawing Sheets

(56) References Cited

U.S. PATENT DOCUMENTS

| | | | | |
|---|---|---|---|---|
| 2003/0011466 A1* | 1/2003 | Samuel | ............... | A45C 13/24 340/5.73 |
| 2004/0163913 A1* | 8/2004 | Tschudy | ............... | A45C 5/06 190/111 |
| 2005/0200454 A1* | 9/2005 | Martinez | ............ | E05B 47/0611 340/5.65 |
| 2005/0225432 A1 | 10/2005 | Lindskog | | |
| 2008/0246587 A1* | 10/2008 | Fisher | ............... | A47G 29/10 340/5.73 |
| 2009/0077675 A1* | 3/2009 | Cabouli | ............... | A45C 1/06 726/34 |
| 2011/0063138 A1* | 3/2011 | Berkobin | ............ | G08G 1/207 340/988 |
| 2012/0310972 A1* | 12/2012 | Wohl | ............... | G06Q 50/00 707/769 |
| 2015/0015394 A1* | 1/2015 | Hansen | ............ | G08B 21/0227 340/539.13 |
| 2015/0237981 A1* | 8/2015 | Godshaw | ............ | A45C 13/185 150/102 |

* cited by examiner

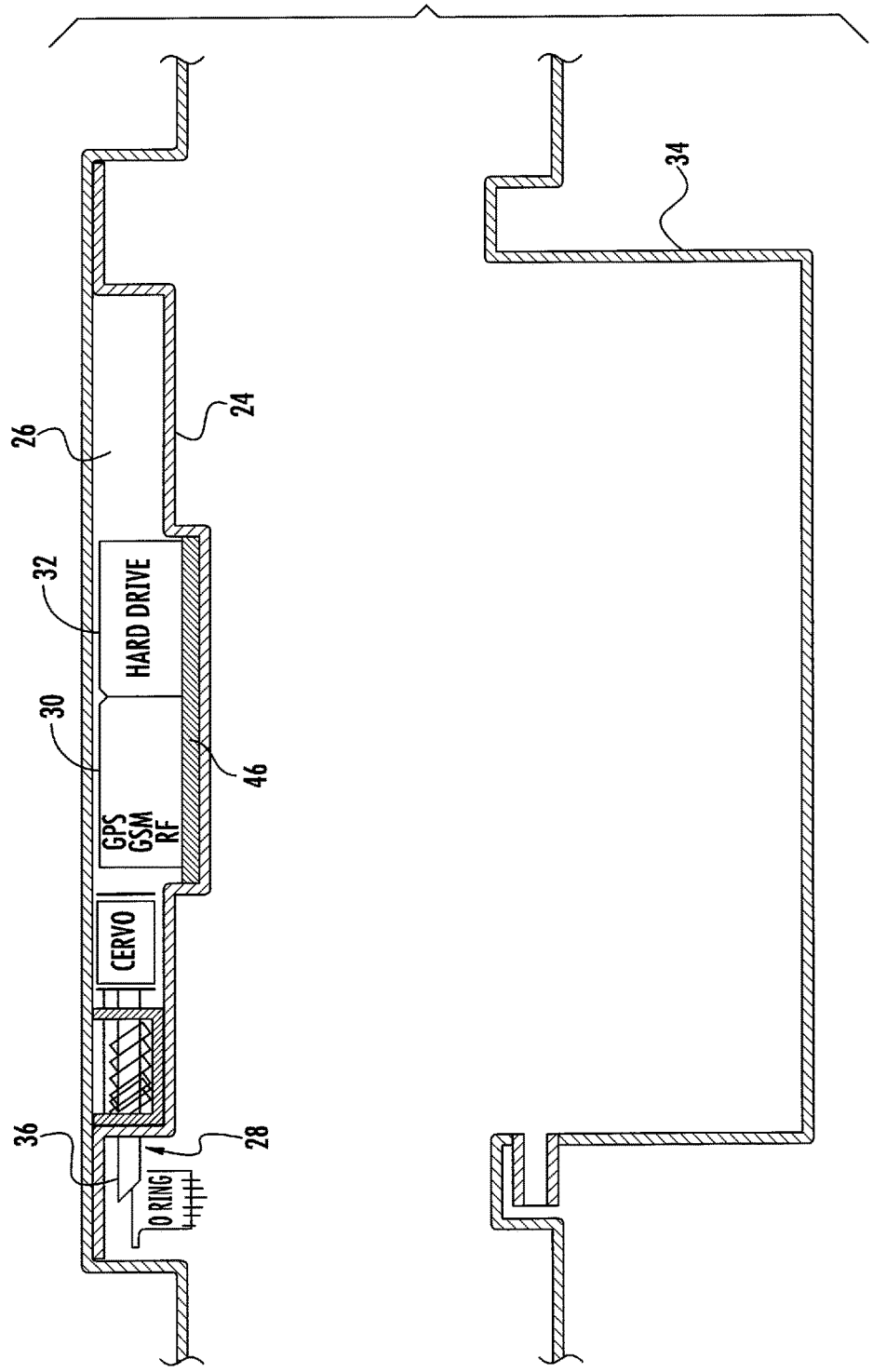

SECURITY CASE

PRIORITY CLAIM

In accordance with 37 C.F.R 1.76, a claim of priority is included in an Application Data Sheet filed concurrently herewith. Accordingly, the present invention claims priority to U.S. Provisional Patent Application No. 61/800,958, entitled "Security Case", filed Mar. 15, 2013, which was a continuation-in-part of U.S. patent application Ser. No. 13/101,336, entitled, "Security Case", filed May 5, 2011. The contents of each of the above referenced applications are herein incorporated by reference in their entirety.

FIELD OF THE INVENTION

The present invention relates to the secure transportation of valuable objects; in particular, it relates to a portable container which restricts access to the contents within the container to authorized individuals and enables the container to be tracked.

BACKGROUND OF THE INVENTION

With crime always on the rise, especially today, it is imperative to provide protection for valuable materials such as jewelry, financial files, financial documents, credit cards, intelligence files, etc. Since the transportation of these objects cannot always be restricted to armed and secure vehicles, individuals must be relied on to transport these valuables. To enable an individual to securely transport these valuables, a portable security case or container must be provided.

DESCRIPTION OF THE PRIOR ART

U.S. Publication No. 2005/0225432 discloses a method of transporting an alarmed container. The alarmed container is used to transport valuables. The alarmed container includes a first electronic unit which functions to accept and permit deactivation and/or opening of the alarmed container. The container is opened with the aid of a primary key which includes a second electronic unit that communicates with the first electronic unit in respect of initiating opening of the container. The primary key accompanies an individual transporting the container, and the container is opened and/or its alarm system deactivated at its destination with the aid of a code subset from the individual carrying the primary key in co-action with a code subset obtained from a destination-located secondary key, therewith providing a total code-set required for initiating opening/deactivation of the container.

U.S. patent application Ser. No. 13/101,336 discloses a security case that can be secured in a locked condition which can be operated by an electronic key. The electronic key can be programmed to open the case or container dependent upon various different conditions; for example, location, time, identification of operator, etc. In addition to the electronic key, a biometric identification device can be employed. The exterior of the case or container is made from different materials which are impermeable and resistant to heat, drilling and ballistic impact. A GPS type of location device located within the case enables the case to be tracked from remote locations. The present invention is by the same inventor and is an improvement on the invention disclosed in this application.

SUMMARY OF THE INVENTION

The present invention involves the provision of a security case for storing and transporting an item in a secure manner. The case includes a lid coupled to a base and cooperating therewith to define a closable storage chamber. At least one lock device is located inside the case and operable to selectively maintain the lid locked in a closed condition to the base, selectively resisting access to the storage chamber. At least one electronic data input device is associated with the case. At least one location device is associated with the case and is positioned therein; the location device is operable to selectively determine a location of the case. A memory device is associated with the case and is positioned therein. A controller is operably coupled to the memory device, location device, the data input first device and the lock device, and is operable to selectively permit said lock device to be moved to an unlocked condition when at least two of the location device and first device provide acceptable information to the processor. The controller is operable to compare the received first information to second information stored in the memory to determine if the received first information is acceptable and, if acceptable, authorizing the lock device to be unlocked and send a signal to the lock device to move to an unlocked condition.

The present invention is a self contained, portable security case or container. The case is secured in its locked condition by locks which are preferably operated by an electronic key to initiate at least an unlock command, either as the sole input or with other conditions such as location, time, identification of operator with biometric information, etc. The exterior of the case or container can be made from different materials which are impermeable and resistant to heat, drilling and ballistic impact. In addition, a GPS locator system can be included within the case to enable the case to be tracked from remote locations. A system can be provided to confirm the location of a courier relative to the case.

Accordingly, it is an objective of the present invention to provide a security case comprising a plurality of layers which are resistant to unauthorized entry into the case.

It is a further objective of the present invention to provide a security case including a security system contained therein which permits entry into the security case only by authorized individuals.

It is yet another objective of the present invention to provide a security case which includes a location device which permits an individual to track the current and past locations of the security case.

It is a still further objective of the present invention to provide a security case including a security system which utilizes electronic keys to gain entry into the security case.

It is still another objective of the present invention to provide a security case including a location device which utilizes satellites and ground based GPS systems to record and transmit the location of the security case to an individual at a location remote from the security case.

It is another object of the present invention to provide a signal indicative of the location of a courier relative to the case.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 5 is a cross sectional view of the present invention;

DETAILED DESCRIPTION OF THE INVENTION

Figure 1:
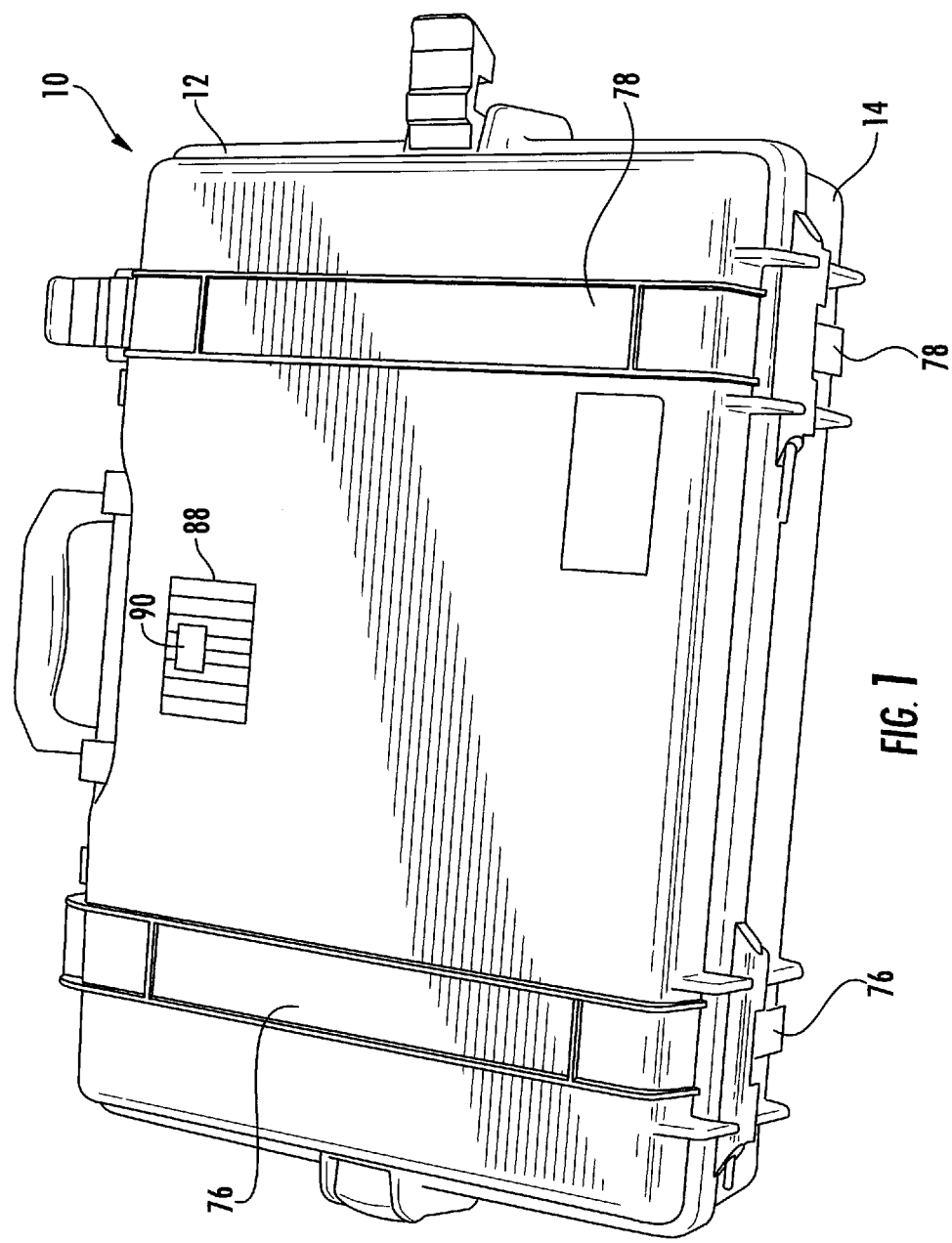
FIG. 1 is a top perspective view of the present invention.

While the present invention is susceptible of embodiment in various forms, there is shown in the drawings and will hereinafter be described presently preferred, albeit not limiting, embodiments with the understanding that the present disclosure is to be considered an exemplification of the present invention and is not intended to limit the invention to the specific embodiments illustrated or described.

FIGS. 1-11, which are now referenced, illustrate the present invention and the manner in which it is assembled. A preferred embodiment of the present invention comprises a portable case or container 10 which is constructed and arranged to securely transport valuable articles. The case 10 is constructed of materials which are resistant to penetration by means such as drilling, impact, ballistic, thermal, etc. The specific materials of construction will be disclosed hereinafter. The case is also designed to resist direct penetration into the interior by providing a tortuous path from the joint of the lid and case into the interior of the case.

Figure 2:
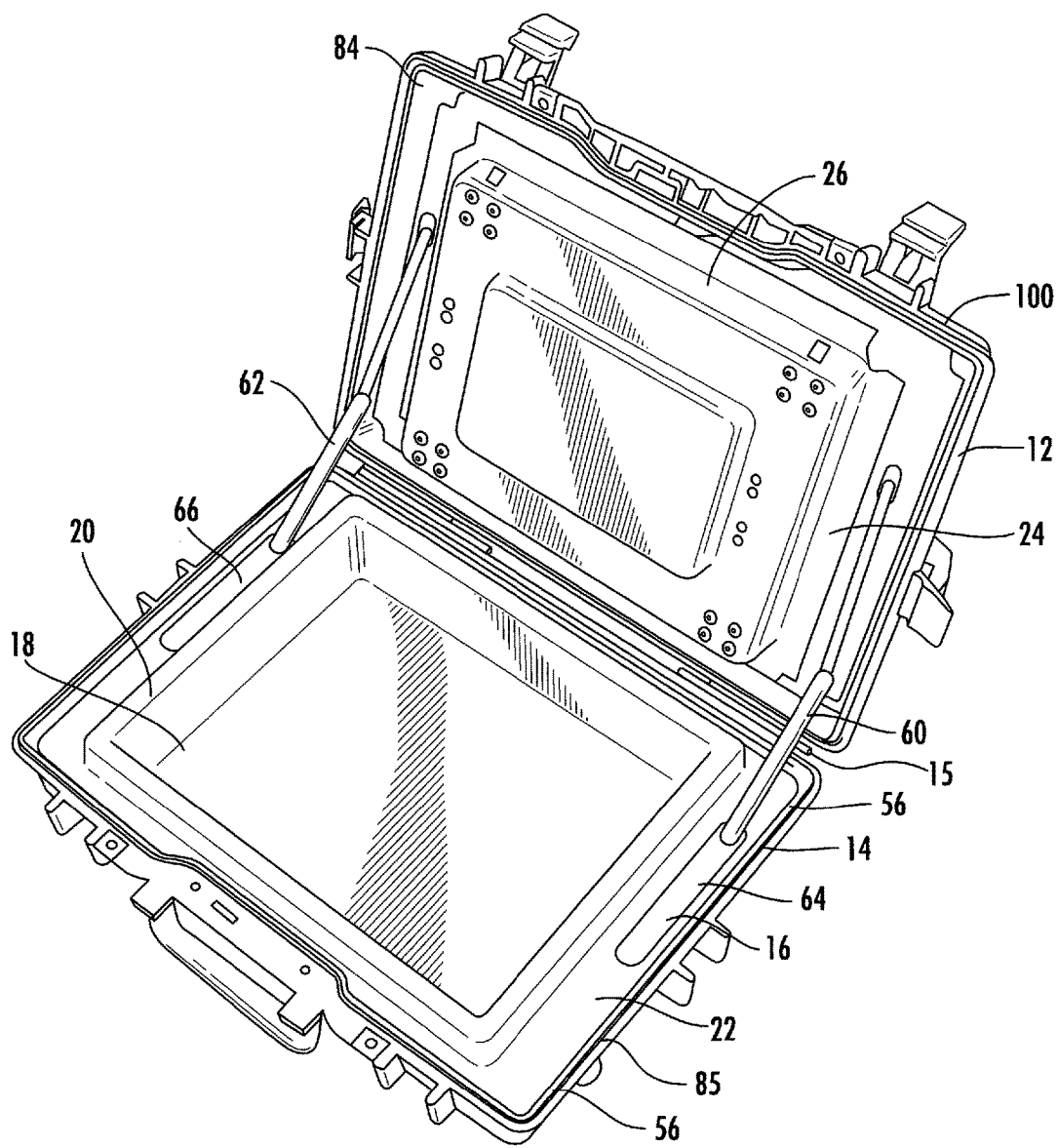
FIG. 2 is a perspective view of the interior of the present invention.

FIGS. 1-7 illustrate a preferred embodiment of the present invention which includes a case 10 comprising a cover or lid 12 hingedly secured to a lower portion or base 14 as with hinge 15. The lower portion 14 includes an insert 16. The insert 16 includes a cavity or lower chamber 18, an upstanding wall or perimeter portion 20 and a spacer or buffer area 22. The valuable articles to be securely transported are housed within the cavity or chamber 18. As can be seen in FIG. 2, the cavity or chamber 18 does not extend to the outermost edges of the lower portion 14. The upstanding wall or perimeter portion 20 extends completely around cavity 18. The spacer or buffer 22 extends outwardly from the cavity upstanding wall 20 to the edge of the lower portion of case 14. The upstanding wall 20 and cavity spacer 22 provide a tortuous path from the edge of the case 10 to the cavity 18, thereby preventing direct access to the cavity 18. This prohibits someone from inserting a thin metal object or similar item to gain access to the contents of chamber 18.

Figure 3:
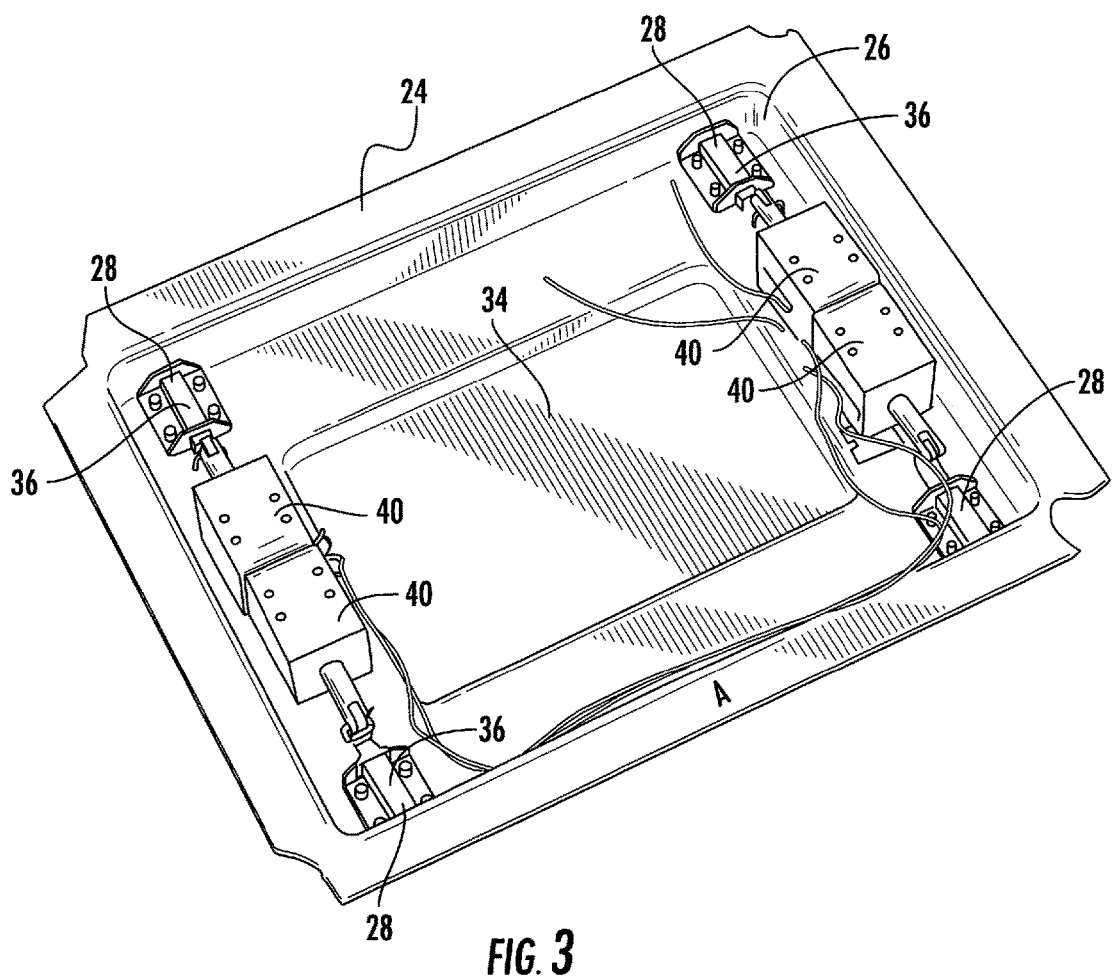
FIG. 3 is a view of the locking mechanism of the present invention.
Figure 4:
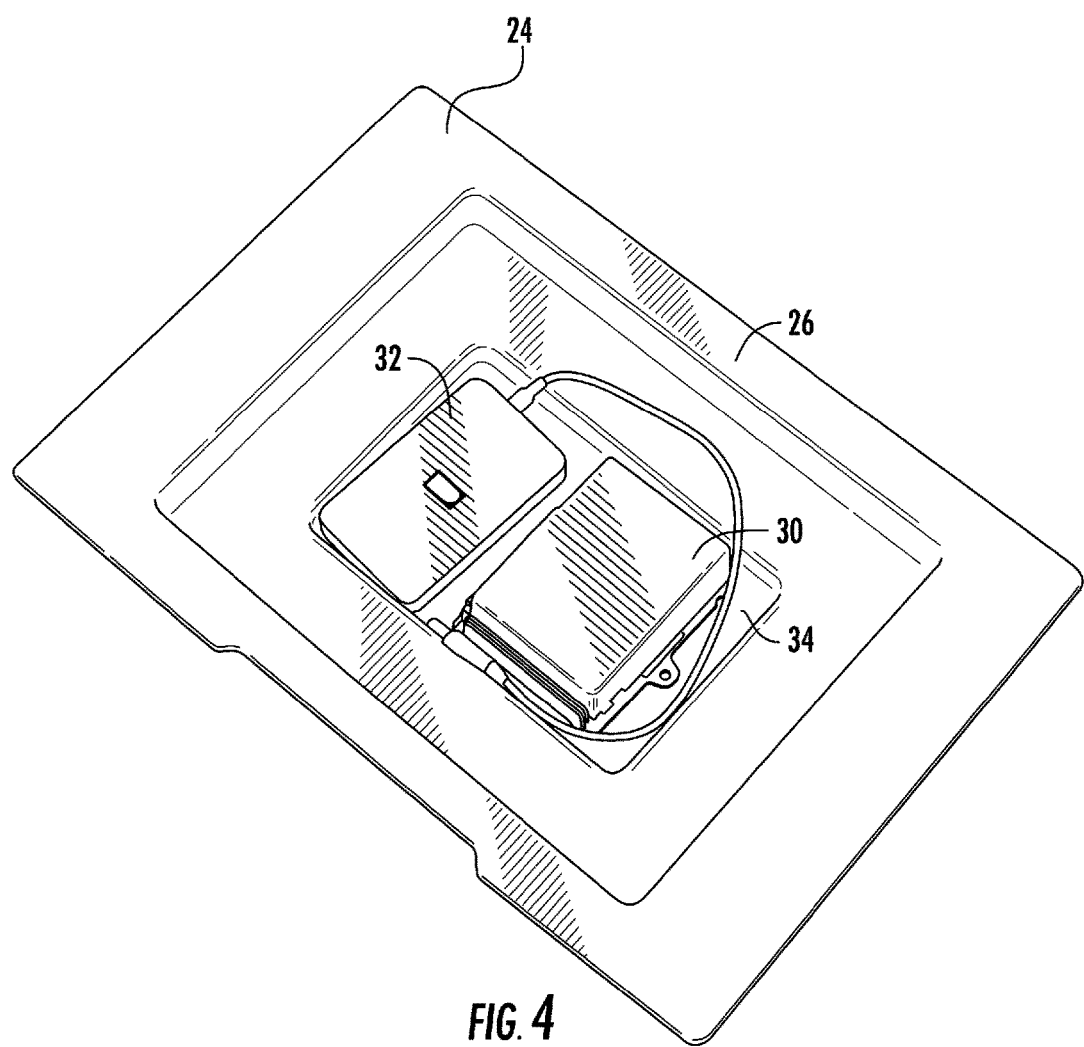
FIG. 4 is a view of the location device and hard drive of the present invention.
Figure 6A:
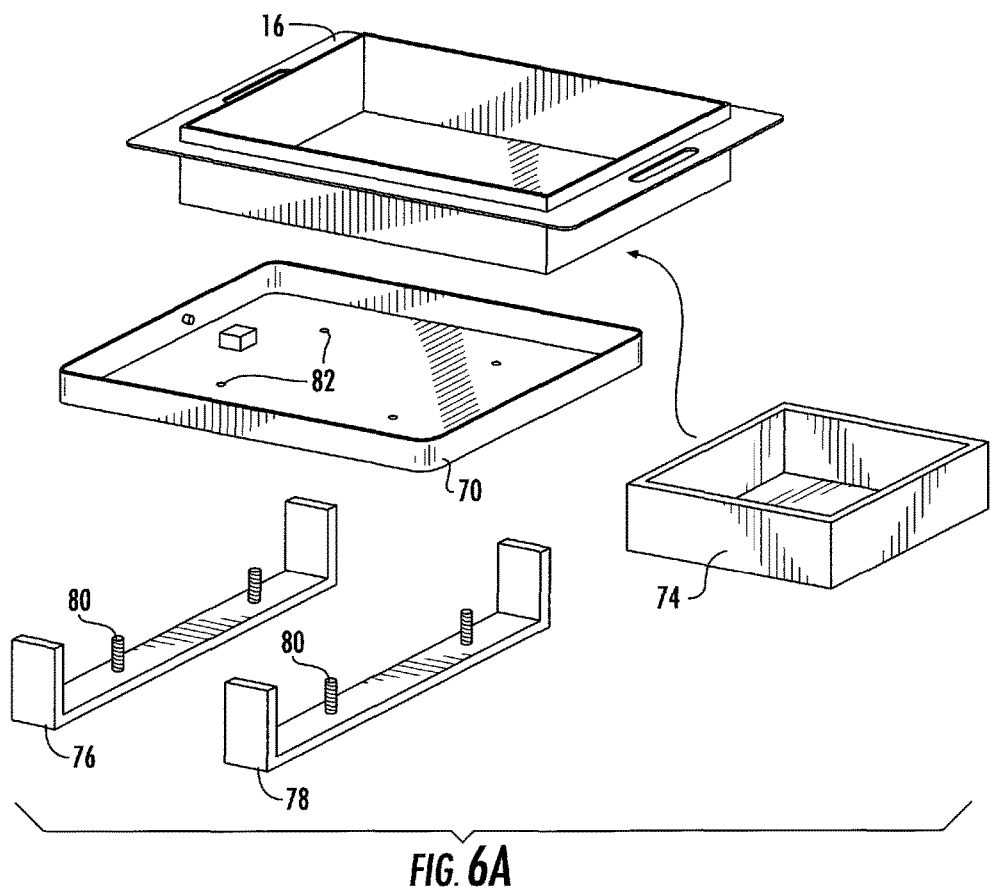
FIG. 6A is an exploded view of a lower portion of the case of the present invention.
Figure 6B:
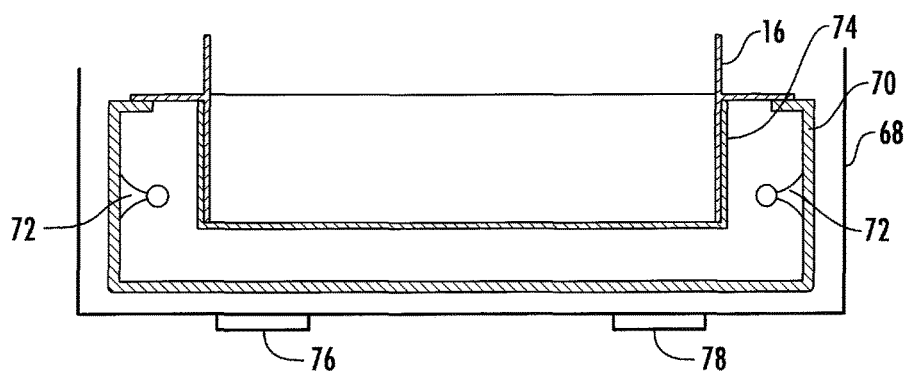
FIG. 6B is a cross sectional view of a lower portion of the case of the present invention.
Figure 6C:
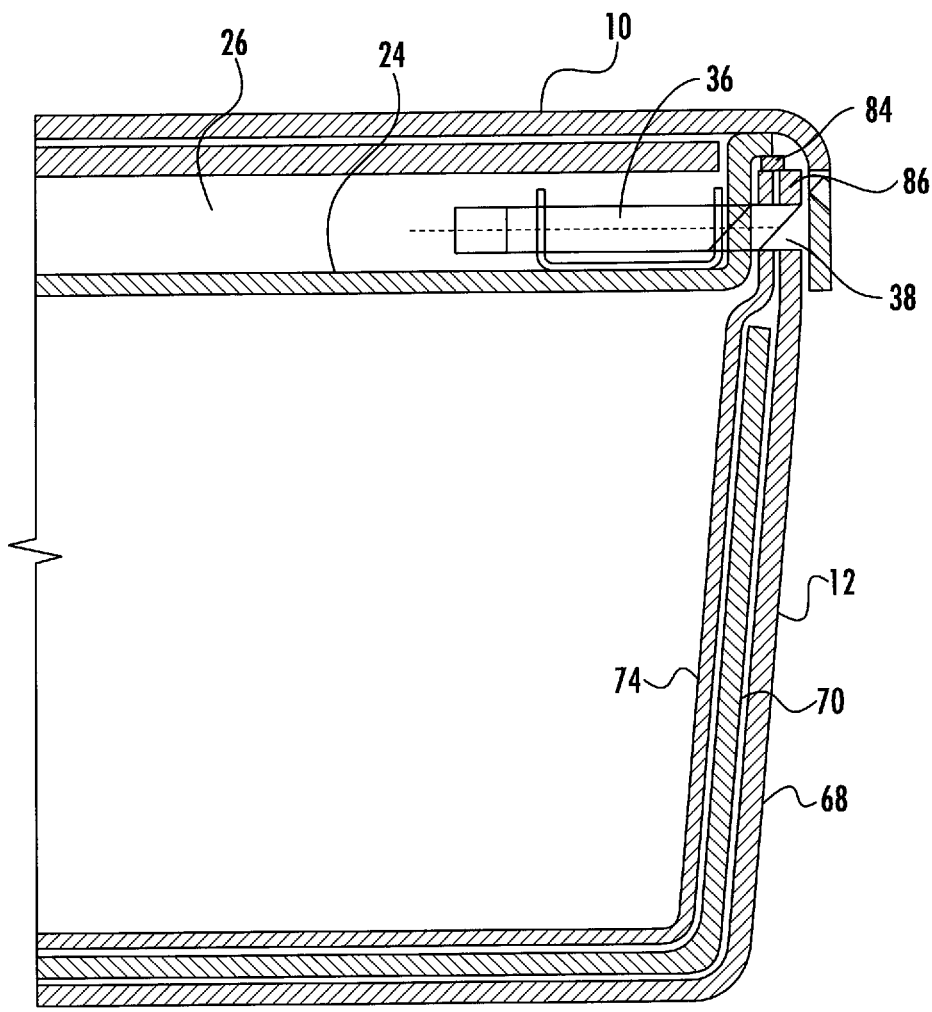
FIG. 6C is a cross sectional view of a lower portion of the case of the present invention.

The cover or lid 12 of the case 10 includes an insert or spacer 24 forming an upper chamber 26 (FIG. 2). The upper chamber 26 contains the locks 28 which secure the case 10 closed (FIG. 3). The upper chamber 26 also contains a GPS location device 30 and an electronic memory device 32 such as a hard drive (FIG. 4). The location device 30 and the memory device 32 are contained within a depression or well 34 of the upper chamber 26. The location device 30 and memory 32 are not illustrated in the upper chamber 26 of FIG. 3. The locks 28 are not illustrated in the upper chamber 26 of FIG. 4. The manner in which the locks 28 secure the lid 12 to the lower portion 14 is illustrated in FIG. 6C. A pin or locking member 36 is an element of each of the four locks 28. The pin 36 moves in a longitudinal direction between an extended or locked position, as illustrated in FIGS. 2 and 6C, and a retracted or open position. In the retracted or open position, the pin 36 does not extend into an aperture in the side of the lower portion 14 of the case. In the locked position, the pin 36 extends into the aperture 38 in the side of the lower portion (FIG. 6C).

Figure 7:
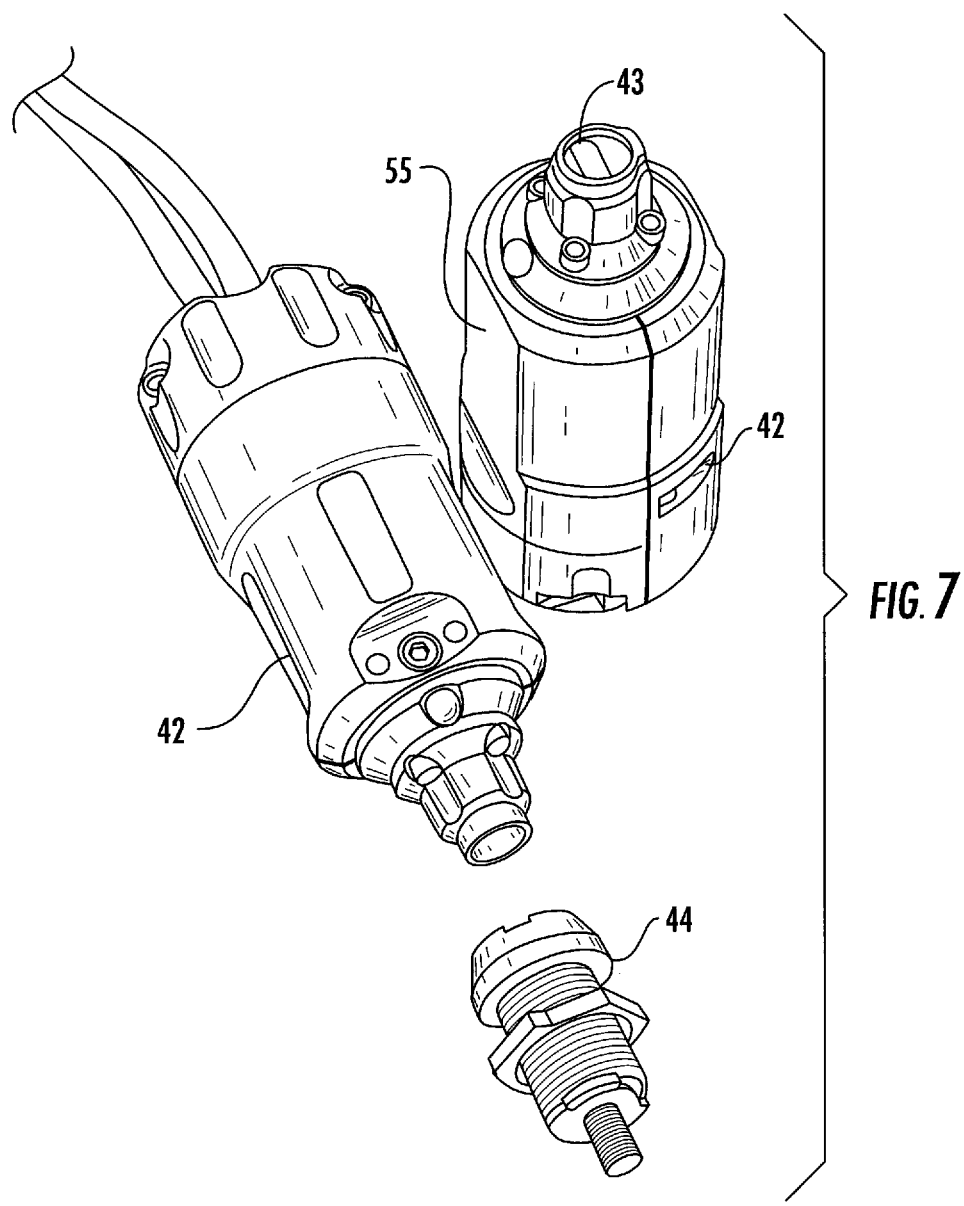
FIG. 7 is a view of the electronic key of the present invention.
Figure 8:
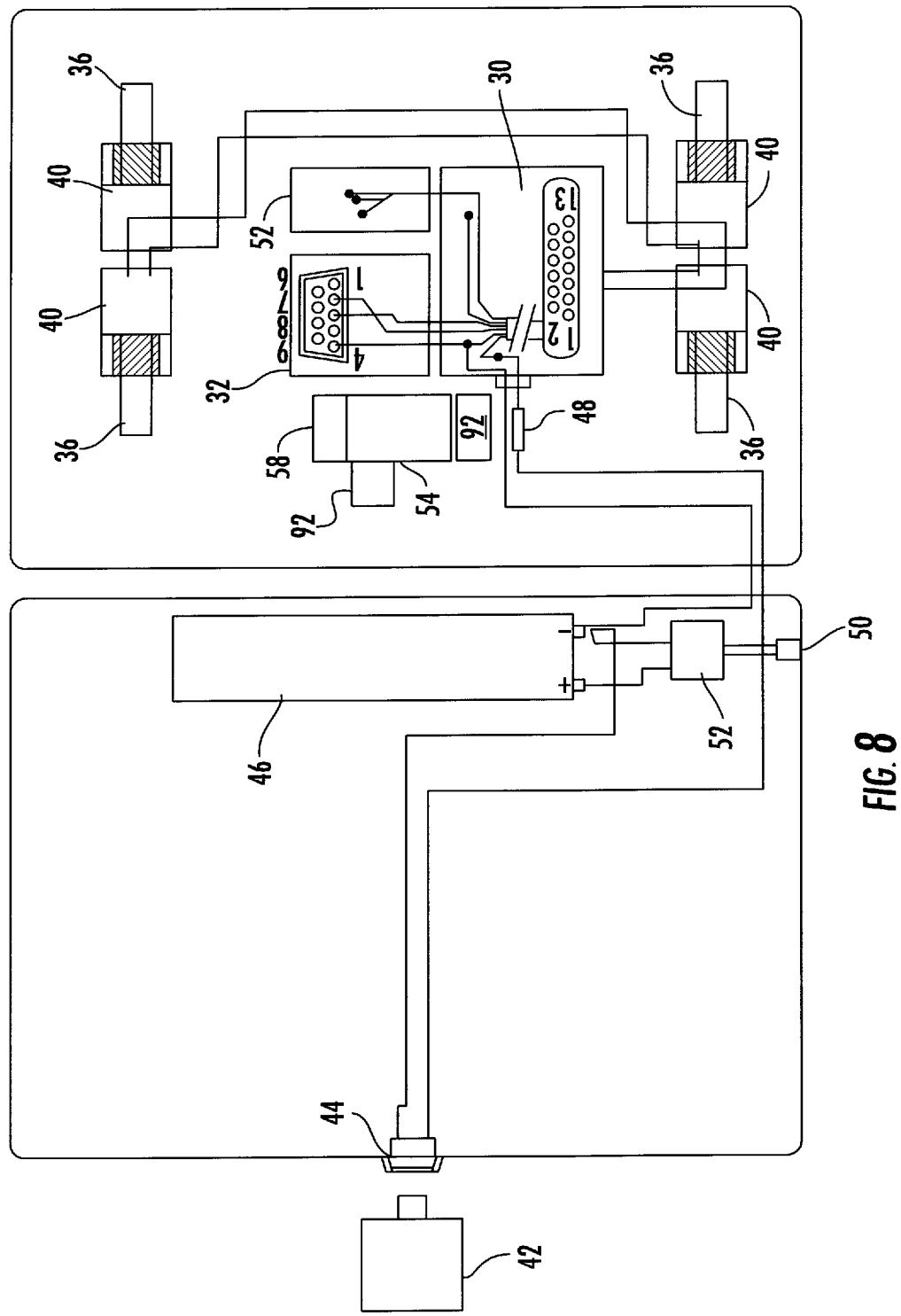
FIG. 8 is a schematic illustration of the electronic locking system of the present invention.

Each of the pins 36 is operated by an electrically powered device such as a solenoid 40. The solenoids 40 are preferably operated according to the schematic of FIG. 8. In place of solenoids 40, stepper motors can also be employed. The stepper motors would preferably drive a worm which is drivingly coupled to a worm gear (not shown), which in turn operates the pins 36. An advantage of such a stepper motor drive system is that the locks 28 cannot be driven backward, thereby preventing access to the interior of said case. An electronic key 42 is utilized to open lock 44 (FIGS. 7 and 8). When lock 44 is open, an electrical circuit is completed. The electrical circuit includes lock 44, a battery 46, a fuse 48, and solenoids 40. While the battery 46 is preferably located within the depression or well 34, it could be located anywhere within the case 10. When the battery 46 is located within the well 34, it is preferably a flat and relatively thin type of battery, as illustrated in FIG. 5. An electrical connector 50 (FIG. 8) is provided through the outer shell of the case. The connector 50 is preferably in the lid 12 of the case 10, but it can also be in the base 14. The connector 50 is electrically connected to an electronic controller 54 which includes a digital processor which regulates the amount and duration of current sent to the battery 46 to recharge the battery. Depending on the type of battery 46, nickel cadmium, nickel metal hydride, lithium ion, lithium ion polymer, etc., the amount of current and rate at which the current is sent to the battery for recharging will be variable in order to protect the battery from overcharging and/or overheating. The electrical power or energy supplied to the connector 50 is preferably from a transformer which converts 120 AC (Alternating Current) voltage to DC (Direct Current) voltage. The amount of DC voltage delivered to the battery is dependent upon the type of battery being recharged.

The electronic key 42 can be programmed to only open specific locks 44. The electronic key 42 includes a plurality of contacts 43 which electrically connect with respective contacts (not shown) on the lock 44. When the lock 44 receives the proper signals or indicators, it permits the electronic key to physically turn and open the lock 44. Preferably, an electronic key locks the case 10 at a point of departure and a separate electronic key at the final destination opens the case 10. The electronic keys can also be programmed to only open the case at a certain time or within a certain time frame or window as preprogrammed. Another feature of the electronic key is that it can be disabled or enabled from a signal transmitted by a satellite, a cell phone or a radio frequency transmission.

Figure 9:
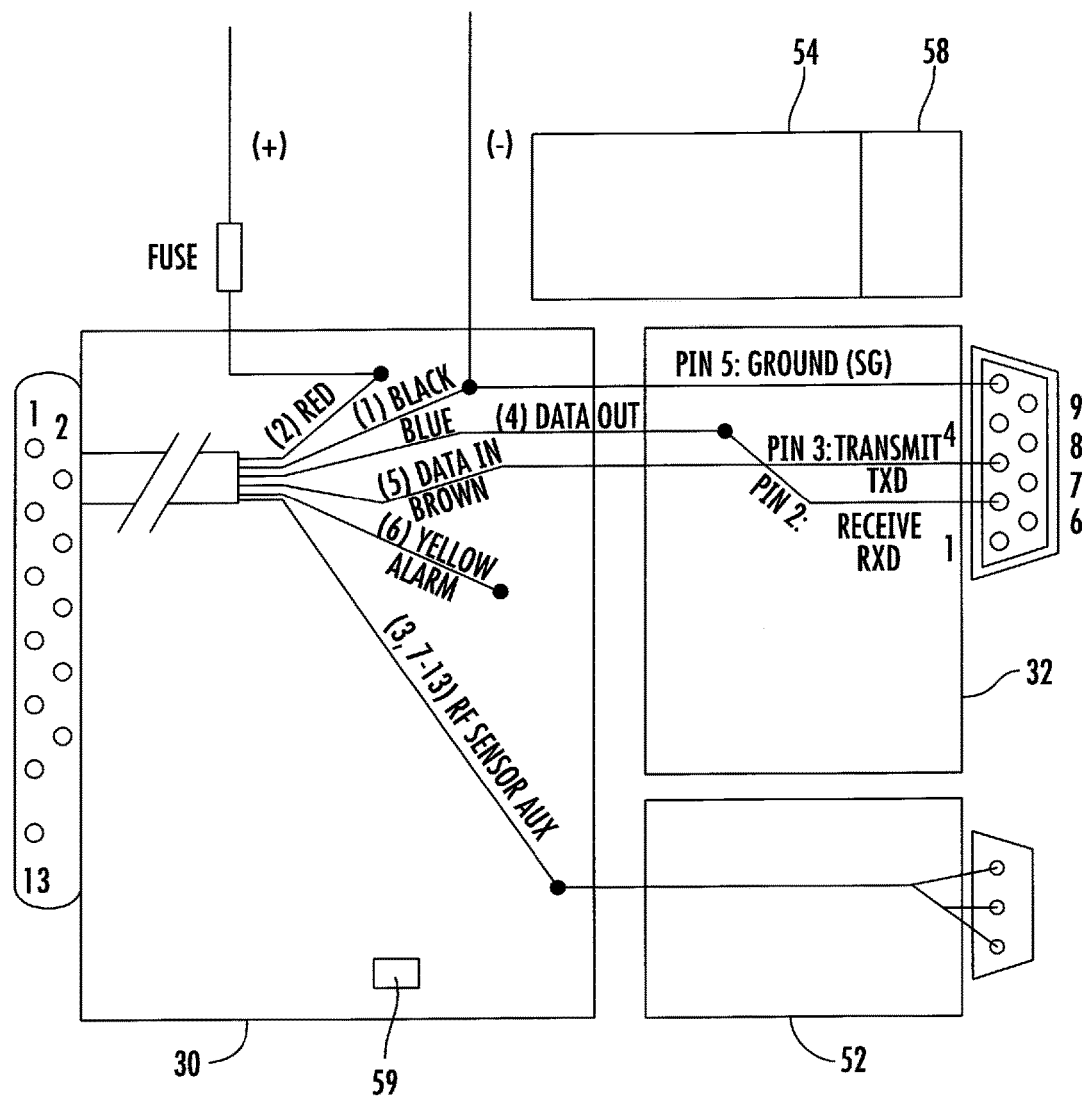
FIG. 9 is a detailed view of a portion of FIG. 8.
Figure 10:
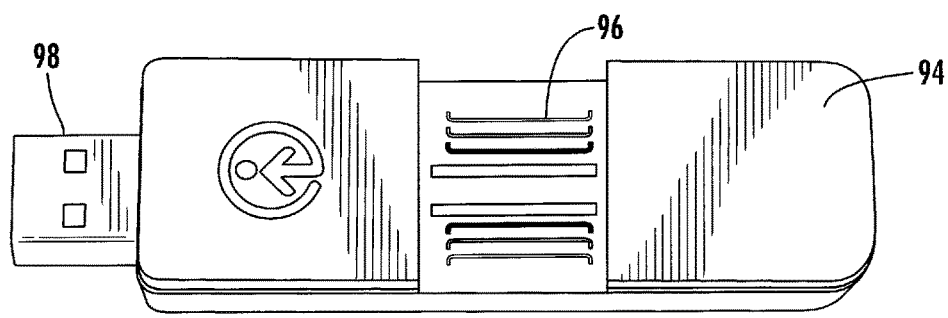
FIG. 10 is a view of a biometric key of the present invention.

Another embodiment of the present invention is illustrated in FIGS. 8 and 9. In this embodiment a location device 30, a memory 32 and a proximity sensor 52 are located within the well 34. The location device can utilize one or more of GPS (Global Positioning System), GSM (Group Special Mobile), and RF (Radio Frequency) signals to determine the location of the case 10. The GPS utilizes satellites and triangulation to determine the location of the case 10. The GSM and RF systems utilize cellular telephones and triangulation to determine the location of the case 10. A travel plan by time of day and location can be stored in the memory 32, and the controller 54 can be programmed to determine if the case 10 is or is not following the travel plan information stored in the memory 32. If the travel plan is not being followed, an alarm can be initiated or a signal sent to a remote location to provide notice of the variance and current location information. The location device 30 can be programmed or provided instructions from controller 54 to continuously or intermittently monitor the various locations of the case 10 as it travels from one location to another, and the controller 54 can effect sending of the location information to a remote monitoring location, wherein the location device is operable to provide route information to the memory device for storage, said route information including location and time of day at location.

This information can also be stored in the memory 32. The location device 30 can also communicate with a user's (such as a monitor at a remote location) cellular phone or similar device to transmit the various locations of the case as it travels from one destination to another. This information can be transmitted via RF or GSM. The location device 30 can also transmit a satellite picture of the location of the case or container to a user at a remote location. In addition, the ZigBee® wireless technology can be employed to transmit the above noted information. This technology is an open global standard that is often employed whenever there is difficulty with RF transmissions, no cell phone towers, etc. When ZigBee® is used for transmission of data, a chip is normally located adjacent the location device 30. The location device 30 is preferably provided with a back-up battery in the event that the main battery 46 goes dead. The back-up battery can be used to transmit the location of the case 10.

The proximity sensor 52 will detect the presence of a smart key or similar device, which can be incorporated into key 42, carried by an individual (for example, a courier) who has been provided with the device. The proximity sensor 52 is programmed to respond when a smart key or similar device is within a predetermined distance of the proximity sensor 52. The electronic smart key or similar device is normally given to the courier of the case 10. The proximity sensor 52 then sends a signal to the controller 54 that an individual with the proper credentials, the courier, is within a predetermined distance of the case 10. Should the courier go outside of a predetermined distance or range, this is an indication that the courier has left or abandoned the case. Another signal is then sent to the controller 54 to indicate this condition or if there is no signal present, the controller 54 is programmed to perform as indicated below. The controller 54 can also be programmed to immediately sound an alarm or transmit a signal to a user at a remote location that the courier has left the case and the location of the case. The user can receive these reports in the form of an e-mail notification. However, other types of cellular phone communications can be employed to notify such user of the location of the case. The e-mail communications can also include a map of the current and previous locations of the case. This enables a monitor to print out a hard copy of the current and past locations of the case. This also enables a monitor to track the path of the case as it moves from one location to another. Should the case move or deviate from a predetermined path, the monitor may alert the authorities or similar individuals that the case has been stolen or diverted from its predetermined path.

In a preferred embodiment, the proximity sensor 52 or other device adapted to be carried by the courier can be provided with means to wirelessly signal the case 10 that the courier is with the case. This can be done with a simple switch or a secure switch device such as a biometric sensor 55 (FIG. 7), e.g., a fingerprint reader and transmitter. The sensor 55 can be incorporated into the key 42. If such a signal is not received in accordance with information stored in the memory 32, the processor 54, in accordance with its programmed instructions, can sound an alarm and/or send a signal to a remote location to inform someone that the instructions have been violated and that there is a possible breach of security. This arrangement can be programmed to require a signal from the courier on a time schedule, location schedule, courier in perceived danger, etc.

The controller 54 can be positioned adjacent to memory 32. The controller 54 is programmed to control and monitor various operations of the case 10. For example, the controller 54 can be programmed to transmit the location of the case 10 at predetermined time intervals. The controller 54 can also be programmed to transmit the saved locations of the case 10 to a monitor at predetermined times. The controller 54 can effect notification to a monitor immediately or at a predetermined delay if and when the courier has left or abandoned the case. The controller 54 can be programmed to determine, from consecutive location transmissions, if the case has been removed from or been diverted from a predetermined path. This would indicate that the contents of the case may have been tampered with.

A plurality of sensors 56 (FIG. 2) can be positioned around the perimeter of the case between the lower portion of the case and the lid of the case. These sensors 56 can determine if the lid 12 of the case has been moved relative to the base 14, indicating that the case 10 has been opened. A light sensor 59 (FIG. 9) on the location device 30 can also be utilized to indicate if the case 10 has been opened. The controller 54 can be programmed to transmit a signal to a remote location if the case 10 has been opened by an unauthorized individual, which is an indication of a potential robbery or theft. The controller 54 can be programmed to recognize authorized opening of the case within a certain time range. It can also be programmed to recognize authorized opening of the case at a specific predetermined location. Unauthorized opening or entry into the case 10 is recognized by the controller 54, and this information is transmitted to an alarm 58. The alarm 58 can emit an audible signal within the case 10, a visual signal outside of the case, and/or it can transmit the information of unauthorized entry to a user or system monitor at a remote location. The remote location can utilize a security monitoring service. In either situation, a person is ultimately notified that there is a problem with the transportation or unauthorized entry into the case.

Another feature of the tracking system is that if the case 10 has not moved within a predetermined time, 3 hours for example, the system goes into a "sleep" mode to conserve the battery. In the sleep mode the location tracking and reporting from the case can be suspended. The sleep mode of the monitoring system can be ended by movement of the case 10 or by transmitting a signal to the monitoring system to stop the sleep mode. This can also be accomplished by pressing a button on the case.

The lid 12 is also secured to the base 14 of the case 10 by a pair of gas shock hinges 60 and 62 (FIG. 2). These hinges pass through the top of insert 16 through slots 64, 66. Theses hinges 60, 62 are pivotally secured to the lower portion of the case, and also to the lid of the case. FIG. 6B is a cross section of the lower portion of the case. An outer shell 68 is preferably formed from Dyneema. This material cannot be cut by conventional means. Next, a tub or trough shaped layer or element 70 is located within the outer shell 68. The element 70 is preferably made from titanium; however, similar materials can be used which are resistant to penetration by drilling. The element 70 is provided with mounts 72 for the lower portions of hinges 60 and 62. The mounts 72 permit the gas shock hinges to be pivotally secured to the base 14. The next element or layer 74 within element 70 is also tub or trough shaped. Element 74 is made from an aramid material. This material is resistant to ballistic penetration. Finally, the insert 16 is located within element 74. Insert 16 is preferably made from a polycarbonate material.

Figure 11A:
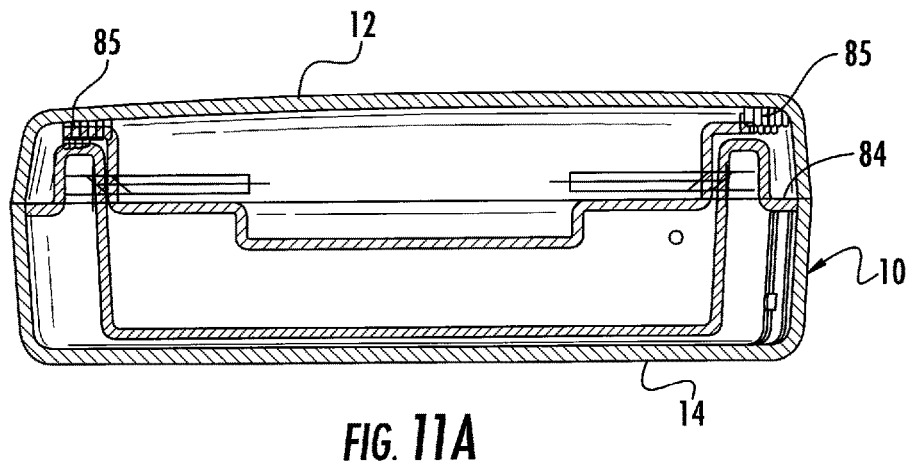
FIG. 11A is a cross sectional view of another embodiment of the present invention in a closed position.
Figure 11B:
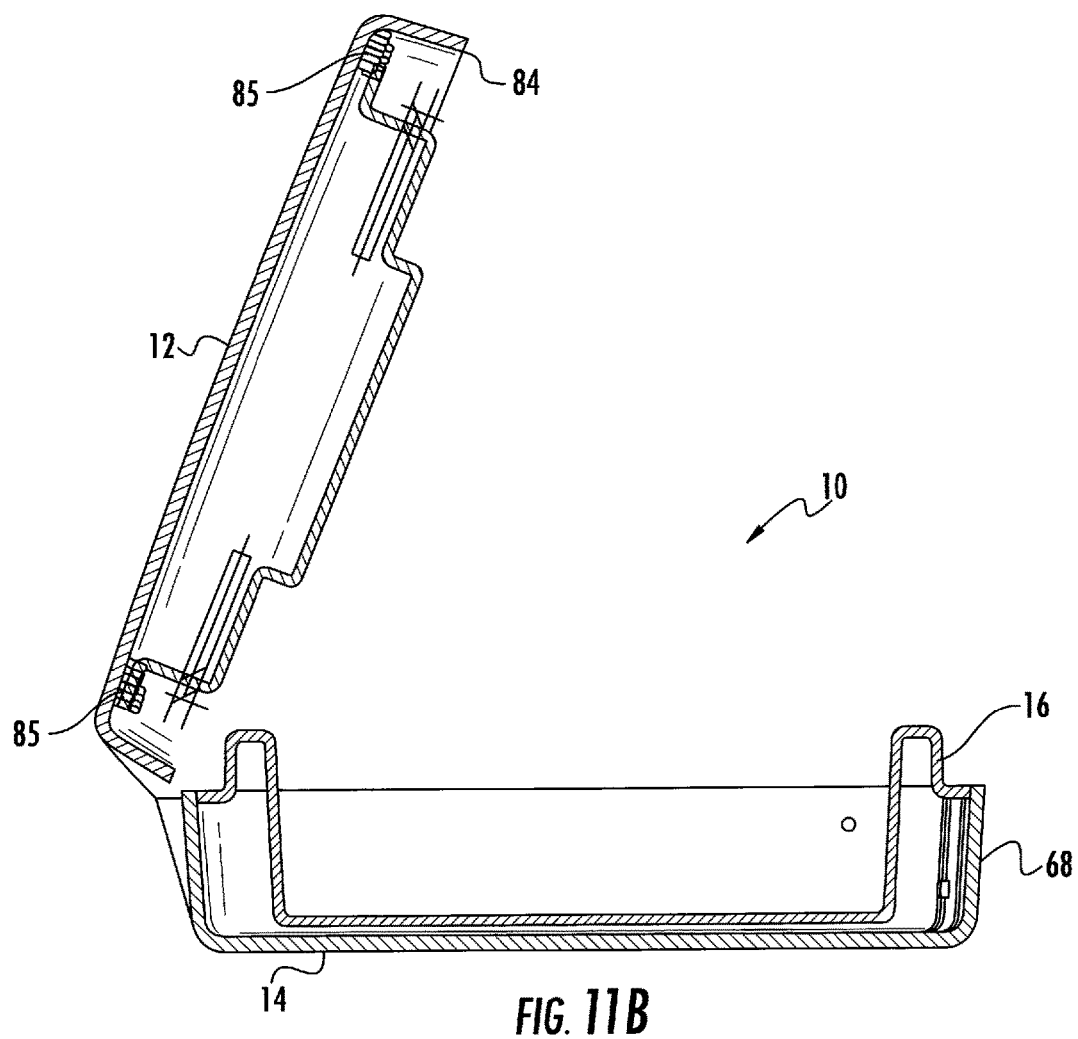
FIG. 11B is a cross sectional view of the embodiment in FIG. 11A in an open position.

A plurality of metal straps 76, 78 are secured to the outer portion of outer shell 68. The straps 76, 78 are provided with a number of threaded studs 80. The studs 80 pass through apertures 82 in element 70 and are secured thereto by nuts or similar means. Element 74 is preferably adhesively adhered to element 70 and insert 16. Other means to secure these elements together can also be employed. The lid 12 of the case 10 is constructed in a manner similar to the lower portion of the case. This type of construction prevents unauthorized entry into the case by most means. The outer perimeter of the lid includes an O-ring or seal 84. The O-ring or seal abuts the upright ridge 86 on the lower portion of the case to form a fluid tight seal. This seal prevents penetration into the case by any type of fluids. An additional seal 85 can be provided between the lid and the upper rim of insert 16 (FIGS. 11A and 11B). The seal 85 extends completely around the lid 12 and insert 16.

Referring to FIG. 1, a biometric detection device, such as a finger print detector 88, is preferably secured to the lid of the case and accessible by a person such as a courier, case sender or recipient. The biometric detection device 88 includes an aperture 90 for placement of finger therein. A sensor below the aperture 90 detects the finger print and sends this information to a controller or chip 92 (FIG. 8) located adjacent controller 54. The controller 92 compares the current finger print information against the authorized finger print information stored in memory, such as memory 32, and permits the case 10 to be opened when a proper match is achieved. Additionally, a particular sensor can be employed which will only authorize entry into the case, for example, when a finger on the left hand of an individual is used. This system can be programmed to only open one side of the case when, for example, the right hand of an individual is placed into the sensor 88. Additionally, a portable biometric sensor 94 (FIG. 10) can be utilized to gain entry into the case. The portable biometric sensor 94 includes an aperture 96 into which an individual places their finger. The portable biometric sensor 94 includes a USB connector 98. This USB connector can be inserted into a USB receptacle or slot 100 located at the front of the lid 12, FIG. 2.

Additionally, a Faraday cage can be provided in the interior of the case 10. The Faraday cage will prevent unauthorized RF transmissions into the case. The titanium element 70 can also function as a Faraday cage.

Figure 12:
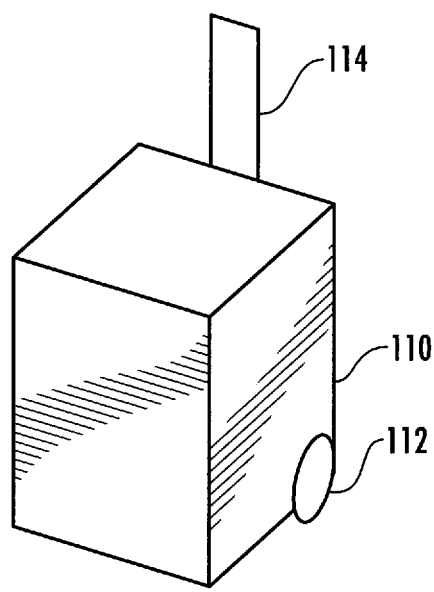
FIG. 12 is a view of another embodiment of the present invention.

FIG. 12 is an alternative embodiment of the present invention. In this embodiment, the case 110 is substantially larger than case 10. Additionally, the case is provided with wheels 112 for ease of transport of the relatively large case. Further, a retractable handle 114 is secured to a rear portion of case 110. The interior construction of case 110 is similar to the interior construction of case 10.

Figure 13:
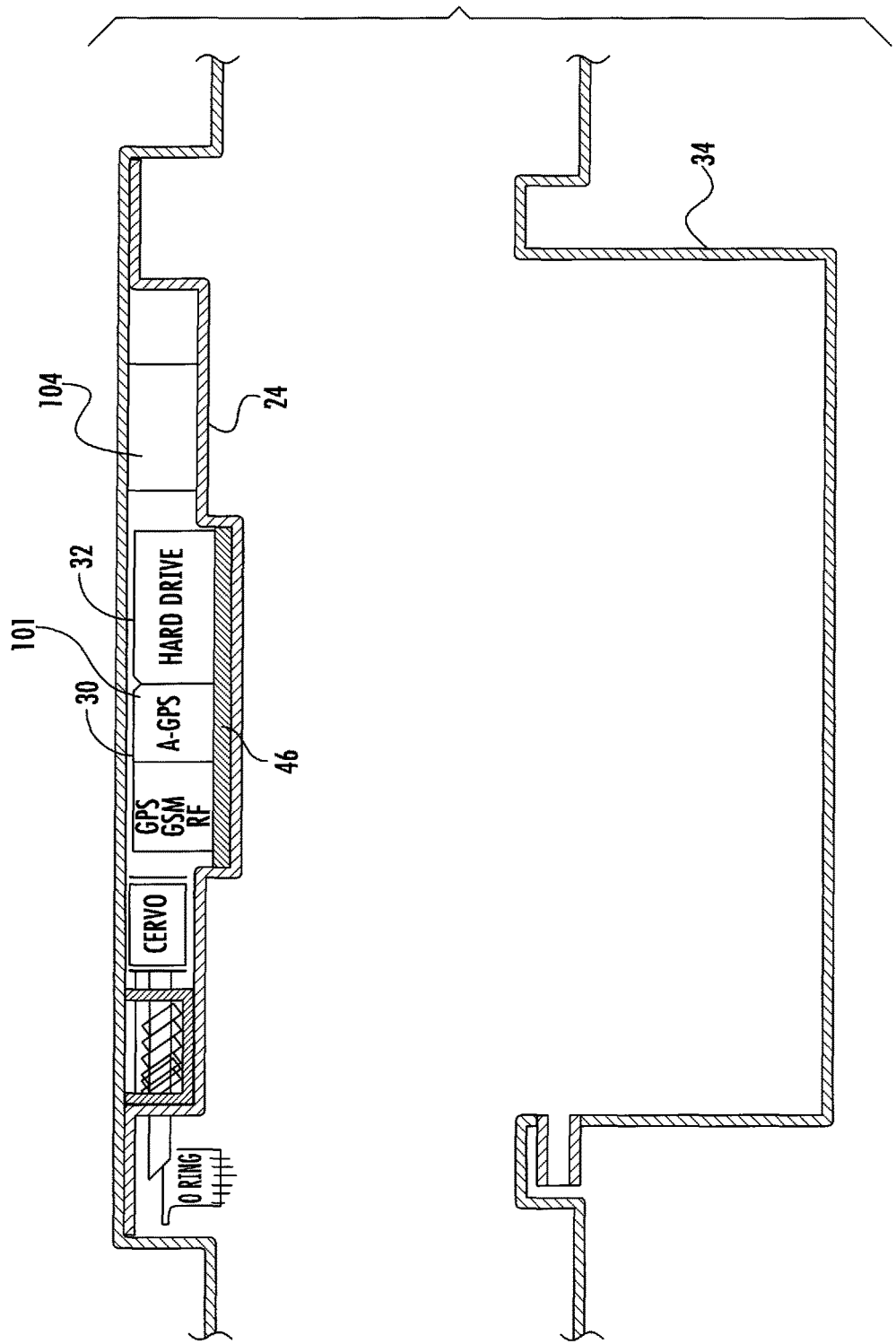
FIG. 13 is a cross sectional view of the present invention similar to FIG. 5.

Referring to FIG. 13, the present invention can include an A-GPS system 101 that can be used in combination with the satellite based GPS system at 30 described above. The A-GPS system 101 would be used in place of the GSM (Group Special Mobile) and RF (Radio Frequency) systems described above. The A-GPS system 101 provides higher accuracy than the latter two systems and a much stronger signal than a satellite based GPS system, and can be detected better in buildings, in cities and in areas that have overhead signal barriers like a tree canopy along bluffs and the like. A-GPS uses land based network resources to locate positions in poor signal conditions. The A-GPS system 101 can also be used alone in the event a signal from the GPS system is not being received.

In a most preferred embodiment, the controller 54 combines biometric input information from a detector 88 with location information from each of GPS, GSM and RF signals that track the case 10 to determine if the case 10 can be opened. The controller 54 can be programmed, depending on the security need, to use any one of these systems for location information. The controller 54 can also be programmed to move from one of the location systems to another in the event there is a weak signal from the initially selected system In this embodiment, all preprogrammed criteria need to be met before the case 10 will open. Once the predetermined information is available to establish that the opening criteria has been met, the controller 54 will provide a signal to the means to unlock the case, e.g., the device 140 to effect unlatching. The controller 54 and the location systems 30, 101 can be used to send signals to a remote system to show a map of the path of movement of the case 10.

The case 10 can also be provided with one or more sensors 104 that are operable to indicate possible physical tampering. For example, an accelerometer, vibration sensor or microphone could be provided that would be coupled to the controller 54 that could indicate a hammer blow, vibrations from a cutting tool or the like. One or more thermal sensors can be provided and coupled to the controller 54 to indicate an elevated temperature which could indicate an attempt to use a torch to cut open the case 10. The controller 54, upon receiving a signal from such a sensor, would then alert a case tracker or monitor at a remote location and/or set off a built in alarm as described above. The type of sensor activated can be transmitted to indicate the possible type of tampering along with the location of the case 10.

As shown in FIG. 1 and as described above, a biometric detection device is provided. A plurality of such detectors can be used, such as a plurality of finger print detectors 88 in order to further secure the case 10, instead of a single biometric detection. In one embodiment, two fingers can be read by the detectors simultaneously to approve unlocking.

However, it is to be understood that one detector 88 can be used for reading successive body part exposures such as a plurality of fingers in sequence. A sensor below the aperture 90 detects the biometric information and sends this information to the controller or chip 92 located adjacent controller 54. The controller 92 compares the current finger print or prints against the authorized finger prints and permits the case 10 to be opened when a proper match is achieved, assuming other information is not requested. Further, the controller 54 can be configured to allow the case to only be opened if it is located at a pre-approved location, even if the correct biometric information has been identified. Additionally, the controller 54 can be configured to recognize an unauthorized finger to send a signal that an unauthorized attempt to open the case has been made. The unauthorized finger or other readable biometric information can be provided for scanning by an authorized courier as an alert of a problem. The controller 54 can send a signal to provide the location of the case at the time of the alert. Further, a particular body part can be associated with a particular kind of alert, for example, the small finger could be scanned to indicate a flight delay while an index finger could indicate kidnapping. The alert can also trigger an alarm in the case 10 such as an audio alarm. The alert could also trigger activation of an alert like an explosive dye pack.

Controller 54 can also be configured to not permit opening of the case until the case is at a predetermined location as determined by, for example, the GPS location device 30 and/or A-GPS 101 device. See FIG. 13. Controller 54 may also be configured to provide an alert to be given by the case, such as an audio alarm or signal, to a remote location if the case deviates from a predetermined travel path that is programmed into the processor 54 or upon alert from a case tracker monitoring progress of the case 10. Separation of the case 10 from the courier, as indicated by proximity sensor 52, can also trigger an alert to the remote tracking system and the case 10 and initiate an alarm or other activity such as an audio alarm or explosive die pack. The proximity sensor 52 may be of a Bluetooth enabled system type.

Figure 14:
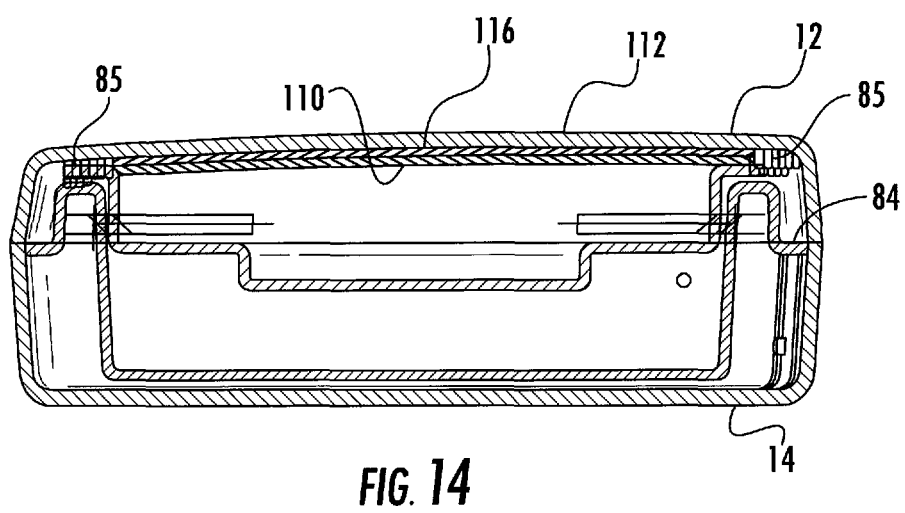
FIG. 14 is a cross sectional view of another embodiment of the present invention in a closed position similar to FIG. 11A.

The case 10 as described above can also be made additionally tamper resistant in addition to the means described above. For example, the inserts 16, 24 can be made of an impact resistant material such as polycarbonate, providing multiple layers of material in the lid 12 and base 14. The lid 12 and base 14 can be constructed to resist penetration with cutting tools and/or impact depending on the level of security needed and the materials to be secured in the case 10. The lid 12 and base 14 may be of a laminated multiple layer construction, say of polycarbonate and metal, one layer 110 to resist impact and one layer 112 to resist cutting, see FIG. 14. A layer 116 of material may be interposed between two layers that will gum up a mechanical cutting tool; some polymeric materials and metals will gum a mechanical cutting tool and slow cutting into the case. The laminated construction is shown as only a portion of the lid 12, but it is to be understood that it can be located as any part of the lid 12 and base 14. The case 10 can be constructed of a material that, if entry is attempted by cutting with a flame, the case will self destruct, destroying the contents. One suitable metal alloy to accomplish this is magnesium alloy. Phosphorous or some of its compounds could also be used in a laminated structure.

Figure 15:
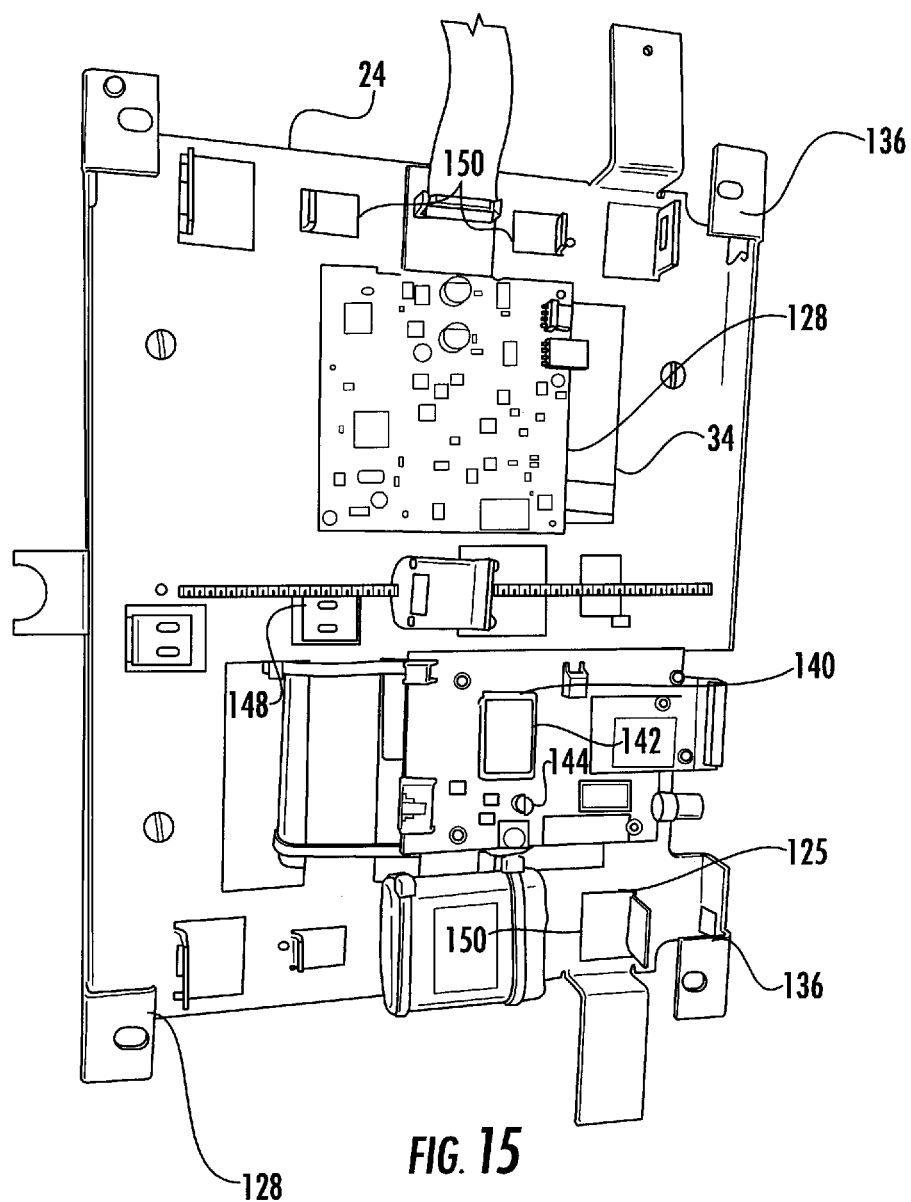
FIG. 15 is a plan view of a modified form of the invention showing means to unlock the case.

FIG. 15 shows an additional embodiment of the invention. It utilizes a different locking and unlocking mechanism than that described above through the use of a single drive device operably connected to the locks 128. The locks 128 are similar in construction and operation as the locks 28 described above. A pin or locking member 136 is an element of each of the four locks 128. The pin 136 moves in a longitudinal direction between an extended or locked position and a retracted or open position. In the retracted or open position, a pin 136 does not extend into an aperture in the side of the lower portion 14 of the case. In the locked position, the pin 136 extends into the aperture 38 in the side of the lower portion (FIG. 6C). Each of the pins 136 is operated by a suitable electrically powered drive device 140 such as a stepper motor. The device 140 is secured to the insert 24 and is located in the well 34. There is provided a pair of worms 142 for selective rotation by the device 140. The worms 142 are each received in a respective worm gear 144 which moves in response to rotation of the respective worm 142. As shown, the worm gears 144 are each operable connected to a respective link 147 via a respective bracket 148. The links 147 are each connected to a respective pair of locks 128 as at 150. Thus, when the device 140 is made operable upon command from the processor 54, the links will move in unison effecting either locking or unlocking movement of the pins 136. Only one drive device is needed in this construction.

All patents and publications mentioned in this specification are indicative of the level of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A portable security case for storing and transporting an item in a secure manner, the case adapted to be carried by a user and comprising:
   a lid coupled to a base and cooperating therewith to define a closable storage chamber, the base including a carrying handle;
   a first insert positioned in said lid, said first insert including a well in a central portion thereof forming an upper chamber, a first buffer extending parallel to an inner surface of said lid for securement to said inner surface of said lid with said well facing said inner surface of said lid, said well and said inner surface of said lid forming an area for housing electronics whereby said electronics are not accessible to a user of the portable security case without destroying said first insert, a seal positioned between said first buffer and said inner surface of said lid;

said base including a second insert, said second insert including a centrally located lower cavity surrounded by an upstanding wall, a second buffer extending laterally with respect to said upstanding wall for attachment to an inner surface of said base, an outer perimeter of said upper chamber is sized and shaped to fit within said upstanding wall when said security case is in a closed position;

at least one lock device located within said well of said first insert and operable to selectively interlock said first insert and said second insert to maintain the lid locked in a closed condition to the base selectively resisting access to the storage chamber, said at least one lock device including an electronic lock receiver that communicates electronically with an electronic key, said electronic lock receiver mounted remotely from at least one lock pin and at least one lock pin actuator, whereby electrical communication between said electronic lock receiver and said electronic key provides an electrical signal to a controller, said controller examining said electrical communication between said electronic key and said electronic lock receiver, said controller constructed and arranged to send an electrical signal to said remotely mounted at least one lock pin actuator to move said at least one lock pin to an open or a closed position via electrical actuation;

at least one electronic data input first device associated with the case, said at least one electronic data input first device is said electronic key;

at least one location device associated with the case and positioned therein, the location device being operable to selectively determine a location of the case;

an embedded proximity sensor associated with said electronic input first device;

a memory device associated with the case and positioned therein; and a controller operably coupled to the memory device, location device, proximity sensor, the data input first device and said lock device and operable to selectively permit said lock device to be moved to an unlocked condition when at least two of the location devices and said at least one electronic data first input device provide acceptable first information to the controller, said controller being operable to compare the received first information to second information stored in the memory to determine when the received first information is acceptable and, when acceptable, authorizing the lock device to be unlocked and send said electrical signal to said remotely mounted at least one lock pin actuator to move said at least one lock pin to an open or a closed position via electrical actuation.

2. The portable security case of claim 1 wherein the at least one electronic data input first device including a plurality of said electronic data input first devices.

3. The portable security case of claim 2 wherein said plurality of said at least one electronic data first devices include a biometric reading device and said electronic key device.

4. The portable security case of claim 2 wherein said controller is operable to determine when the security case location first information matches location second information in the memory to determine when the location first information is acceptable and, when acceptable, authorize said electrical signal to be sent to said remotely mounted at least one lock pin actuator to move said at least one lock pin to an open position via electrical actuation.

5. The portable security case of claim 3 wherein the location device is operable to provide route information to the memory device for storage, said route information including location and time of day at location.

6. The portable security case of claim 5 wherein the controller and memory being operable to provide an alarm if the security case is not following travel plan third information stored in the memory.

7. The portable security case of claim 2 including at least one first sensor coupled to the controller and memory device operable to determine when an unauthorized attempt to open the case or unauthorized opening is effected and to sound an alarm and send a signal of an event to a remote location.

8. The portable security case of claim 7 including at least one sensor operable to sense an attempt to physically tamper with the case.

9. The portable security case of claim 2 including a third device operably associated wirelessly with the controller and adapted to communicate with the controller and provide fourth information about its position relative to the case and, when too far, at least one of sound an alarm and send a signal to a remote location.

10. The portable security case of claim 2 wherein at least one of the plurality of said first devices is a biometric sensor.

11. The portable security case of claim 10 wherein at least one said location device being a GPS device.

12. The portable security case of claim 11 wherein said controller being operable to effect transmission of third information to a remote location.

13. The portable security case of claim 12 wherein the third information including at least one of case location, unauthorized attempts to open the case, deviation from a travel plan, and excess distance of said proximity sensor from the case.

14. The portable security case of claim 13 including a second biometric sensor wirelessly coupled to the processor to remotely provide biometric information to the controller.

15. The portable security case of claim 14 wherein said biometric information from the second biometric sensor can indicate at least one of location reached, time schedule and potential trouble for a courier.

16. The portable security case of claim 2 wherein the portions of the lid and the base having multiple layers of material operable to resist unauthorized access to the storage chamber.

17. The portable security case of claim 1 wherein said electronic key includes a number of contacts that electrically connect with respective contacts on said electronic lock receiver.

* * * * *